Sept. 20, 1971  J. J. CICERO  3,606,453
SEAT BELT EXTENSION ASSEMBLY FOR CHILD'S CHAIR
Filed Oct. 29, 1968  3 Sheets-Sheet 1

James J. Cicero
INVENTOR.

BY
Attorneys

James J. Cicero
INVENTOR

Sept. 20, 1971  J. J. CICERO  3,606,453
SEAT BELT EXTENSION ASSEMBLY FOR CHILD'S CHAIR
Filed Oct. 29, 1968  3 Sheets-Sheet 3
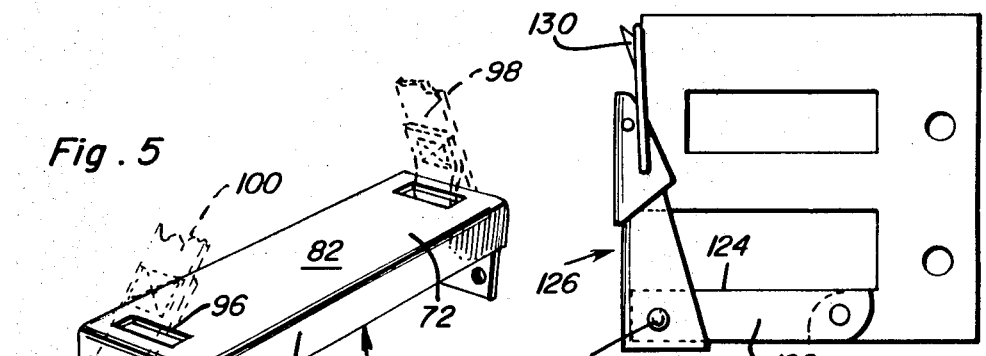
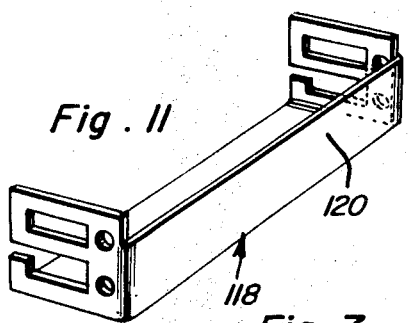
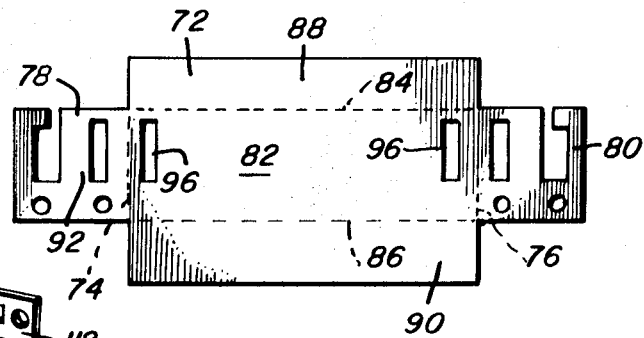
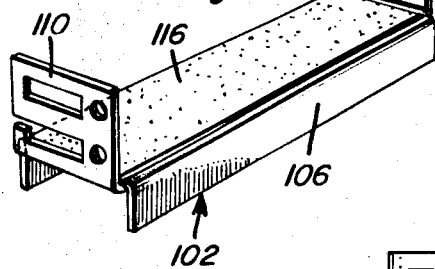
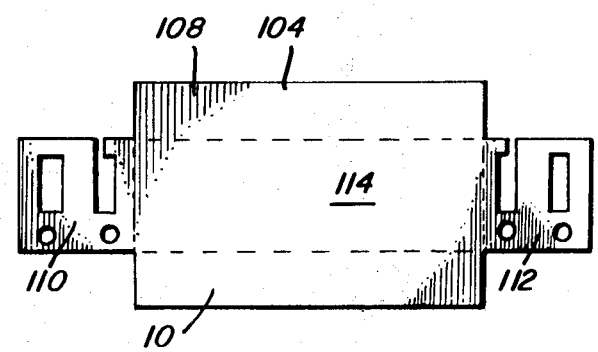
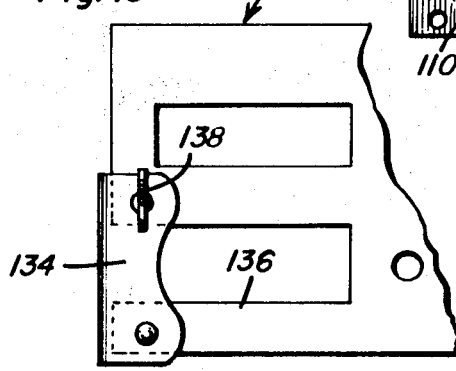
James J. Cicero
INVENTOR.
BY *Clarence A. O'Brien*
and *Harvey B. Jacobson*
Attorneys United States Patent Office 3,606,453
Patented Sept. 20, 1971

3,606,453
SEAT BELT EXTENSION ASSEMBLY FOR
CHILD'S CHAIR
James J. Cicero, 321 N. 7th St.,
River Falls, Wis. 54022
Filed Oct. 29, 1968, Ser. No. 771,410
Int. Cl. A47d 1/10
U.S. Cl. 297—254                                9 Claims

ABSTRACT OF THE DISCLOSURE

An elongated anchor for positioning beneath the seat portion of a child's seat supported from a vehicle seat above the cushion and forward of the backrest thereof. The anchor may or may not be secured to the child's seat, but includes a supplemental seat belt with opposite end portions attached to opposite ends of the anchor and for securement over the lap of a child disposed in the seat. Also, the anchor includes lower opposite end portions for anchored engagement with the conventional vehicle seat belt, whereby the latter will anchor the child's seat to the vehicle seat and the supplemental seat belt will anchor the child in his seat.

---

The extension assembly of the instant invention may be considered to be an extension of the conventional seat belt of a motor vehicle. The extension is to be utilized in securing a supplemental child's seat to the vehicle seat and to secure a child in the supplemental seat.

Although the extension assembly has been specifically designed for use in anchoring either a conventional seat back mounted car seat or a child's size folding lawn chair to a vehicle seat and to also anchor a child in the car seat or foldable lawn chair, it is to be noted that the extension assembly could also be utilized in conjunction with other types of seat or chair structures which could be utilized to support small children in an elevated position relative to a vehicle seat construction.

The extension assembly defines an elongated member for extending beneath the seat portion of a child's car seat or small size lawn chair and provided with opposite end portions adapted for attachment to longitudinally spaced portions of a conventional seat belt operatively associated with the vehicle seat. Further, the anchor includes its own supplemental seat belt which extends between its opposite ends and is adapted to pass over the seat portion of the associated car seat or child's chair for securing a child thereon. In this manner, separate seat belts are utilized to secure the car seat or child's chair in position upon the associated vehicle seat and to secure a child in the car seat or child's chair.

The main object of this invention is to provide a seat belt extension assembly which, when disposed in operative association with a car seat or child's chair supported from a conventional vehicle seat and the conventional seat belt of the vehicle seat, will serve to secure the car seat or child's chair on the vehicle seat and also a child in the car seat or child's chair.

Another object of this invention, in accordance with the immediately preceding object, is to provide a seat belt extension assembly which will be readily adaptable for use in conjunction with different types of car seats and child's chairs to be supported from a vehicle seat.

A still further object of this invention is to provide a device in accordance with the preceding objects and which will be non-complex in operation.

A final object of this invention to be specifically enumerated herein is to provide a seat belt extension assembly which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary perspective view of the interior of a conventional form of motor vehicle having a small child's size lawn chair supported from the seat cushion portion of the vehicle seat forwardly of the backrest portion of the vehicle seat and with the seat belt extension assembly of the instant invention operatively associated with the child's chair for securing the chair to the vehicle seat, through the use of the conventional seat belt, and securing a small child in the chair;

FIG. 5 is a perspective view of a first modified form of extension assembly;

FIG. 6 is a plan view of a sheet metal blank which may be folded along the dotted lines illustrated in FIG. 6 to form the extension assembly illustrated in FIG. 5;

FIG. 7 is a perspective view of a second modified form of extension assembly;

FIG. 8 is a plan view similar to that of FIG. 6 but illustrating the plan shape of the blank utilized to form the extension of FIG. 7;

FIG. 9 is an enlarged end elevational view of a third modified form of anchor assembly illustrating the use of a latch assembly which may be utilized to releasably anchor the extension assembly to the associated conventional seat belt;

FIG. 10 is an elevational view similar to FIG. 9 but illustrating a fourth modified form of extension assembly utilizing a somewhat different form of latch assembly; and FIG. 11 is a perspective view of a fifth modified form of extension assembly.

Figure 1:
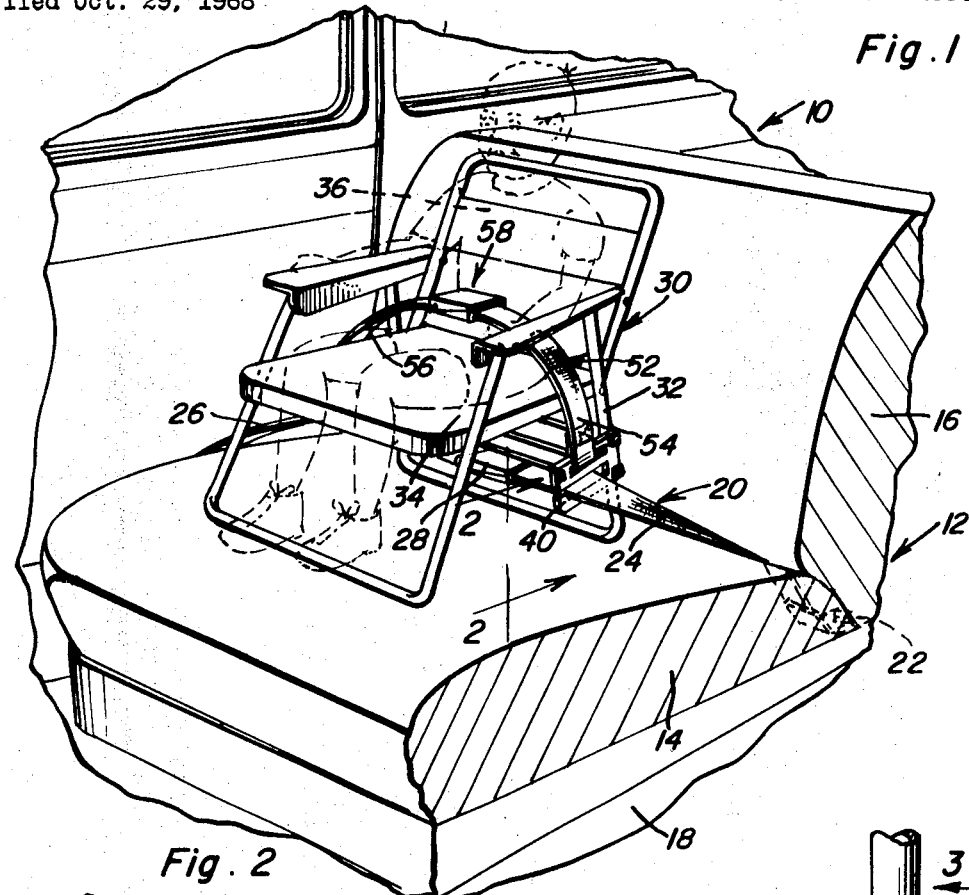
Figure 2:
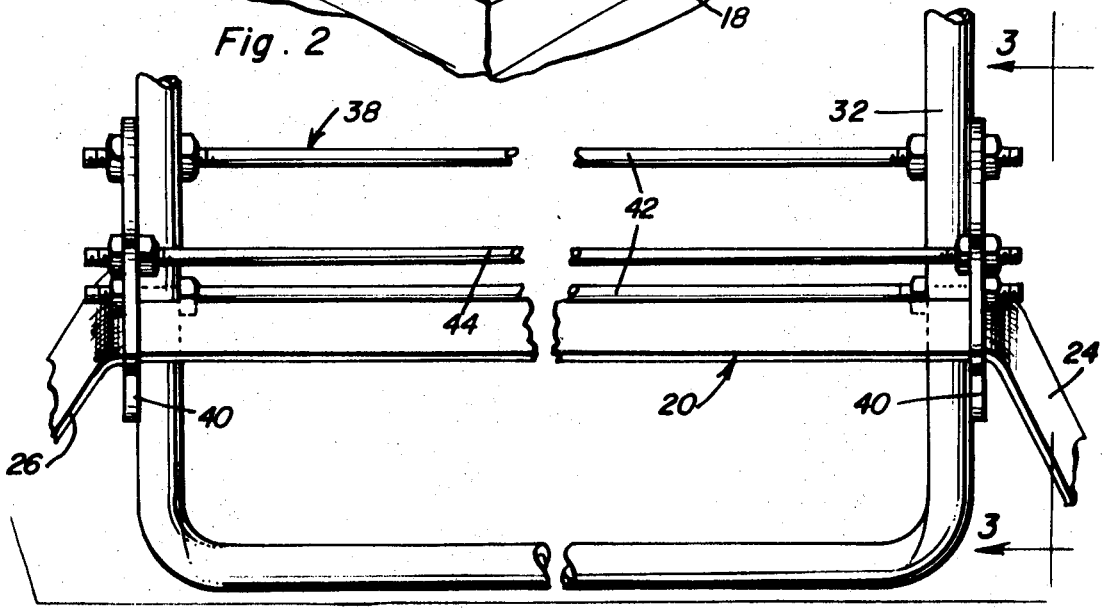
FIG. 2 is a fragmentary enlarged front elevational view taken substantially upon the plane indicated by the section line 2—2 of FIG. 1.
Figure 3:
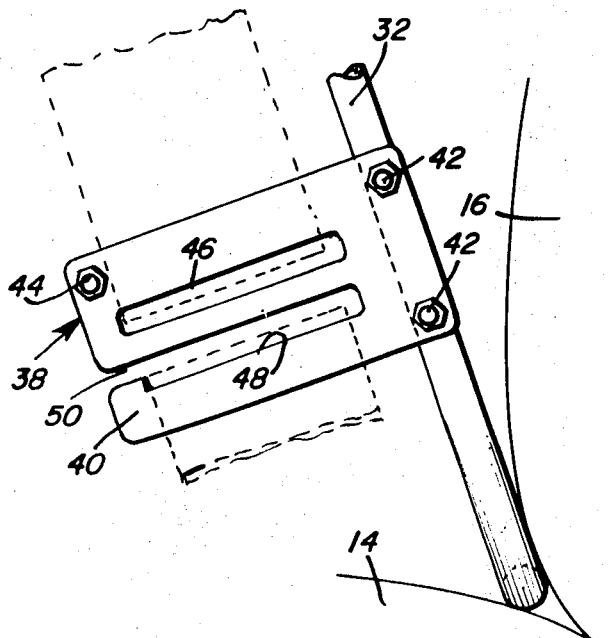
FIG. 3 is an enlarged fragmentary side elevational view taken substantially upon the plane indicated by the section line 3—3 of FIG. 2.

Referring now more specifically to the drawings, the numeral 10 generally designates a conventional form of motor vehicle including a seat construction referred to in general by the reference numeral 12. The seat construction 12 includes a seat cushion 14 and a seat back 16 and the seat construction 12 is disposed on a flooring section 18 of the vehicle 10 to which the opposite ends of a conventional seat belt assembly referred to in general by the reference numeral 20 are secured as at 22. The seat belt construction 20 includes a pair of opposite end sections 24 and 26 removably joined together at adjacent ends by means of a releasable buckle structure 28 and the seat belt construction 20 is usually utilized to secure a person disposed on the seat cushion 14 against forward movement relative to the seat construction 12.

However, in FIG. 1 of the drawings there may be seen a small size folding lawn chair referred to in general by the reference numeral 30 which is disposed on the seat cushion 14 forward of the seat back 16. The chair 30 includes a pair of opposite side rear legs 32 and a seat portion 34 upon which a child 36 is seated.

The extension assembly of the instant invention includes an elongated anchor referred to in general by the reference numeral 38 and consisting of a pair of opposite side plates 40 which are identical in configuration and secured to the legs 32 by means of connecting bracing bars 42 extending between and secured through the legs 32 as well as the plates 40. In addition, a third bracing bar 44 extends between and is secured to the free edge portions of the plates 40 which project forwardly of the rear legs 32.

Each of the plates 40 includes an upper slot 46 formed therethrough which is spaced from an out of communication with all peripheral edge portions of the plate 46. In addition, each of the plates 40 additionally includes a second slot 48 whose forward end opens outwardly through the forward edge of the corresponding plate 40 as at 50.

The seat belt sections 24 and 26, on opposite sides of the buckle assembly 28, are inserted into the slots 48 as illustrated in FIG. 1 of the drawings whereby the chair 30 is secured to the seat construction 12. In addition, the anchor 38 includes a supplemental seat belt construction referred to in general by the reference numeral 52 and including a pair of seat belt sections 54 and 56 secured at their remote ends through the slots 46 and together at their adjacent ends by means of a seat belt buckle assembly referred to in general by the reference numeral 58. The seat belt construction 52 is of course adapted to extend over the lap of the child 36 seated in the chair 30 so as to secure the child 36 in the chair 30.

If it is desired, the seat belt construction 52 may be made of one seat belt section threaded through the slots 46 and including the corresponding components of the seat belt buckle 58 on its opposite ends.

Figure 4:
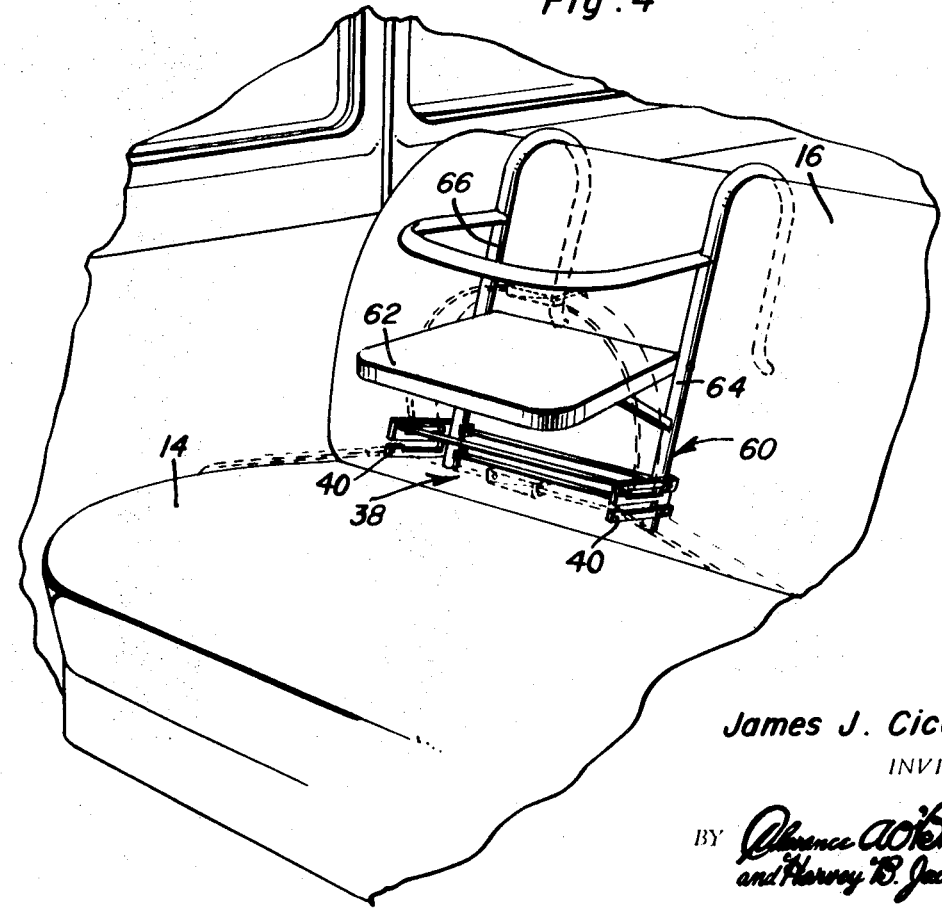
FIG. 4 is a view similar to FIG. 1 but illustrating the extension assembly operatively associated with a conventional form of car seat as opposed to a small size lawn chair.

With reference now more specifically to FIG. 4 of the drawings it may be seen that the anchor 38 may be readily secured to a conventional car seat such as the car seat referred to in general by the reference numeral 60 beneath the seat portion 62 thereof. The car seat 60 includes depending opposite side members 64 and 66 to whose lower ends the plates 40 may be secured in lieu of the legs 32 of the chair 30.

In addition, five additional forms of anchors are illustrated in FIGS. 5, 7, 9, 10 and 11. Referring first to FIG. 5, the first modified form of anchor is referred to in general by the reference numeral 70. The anchor 70 is constructed of a single panel 72 of sheet metal and is bent along bend lines 74 and 76 to form a pair of generally parallel plates 78 and 80 corresponding to the plates 40 and having a bight portion 82 extending therebetween. In addition, the panel 72 is bent along bend lines 84 and 86 in order to form side wall portions 88 and 90 also extending between, but not connected directly to, the plates 78 and 80. The plates 78 and 80 include slots 92 corresponding to slots 46 and slots 94 corresponding to slots 48. In addition, the panel 72 also includes slots 96 which are utilized in conjunction with slots 92 for anchoring the remote ends of a pair of seat belt sections 98 and 100 corresponding to sections 54 and 56 to the anchor 70. Of course, suitable axially short fasteners (not shown) may be utilized to secure the plates 78 and 80 to the legs 32 or bars similar to bars 42 and 44 may be utilized for this purpose so as to also form strong bracing between the plates 78 and 80.

With attention now invited more specifically to FIG. 7 of the drawings there will be seen a second modified form of anchor referred to in general by the reference numeral 102 and which is substantially identical to the anchor 70 except that the slots 96 have been omitted and the side wall portions 104 and 106 of the sheet metal panel 108 from which the anchor 102 is constructed are bent downwardly in a manner similar to the manner in which the side wall portions 88 and 90 are bent and the plates 110 and 112 corresponding to the plates 78 and 80 are bent upwardly as opposed to downwardly. The upper surface of the connecting panel section 114 of the panel 108 is covered by a sheet 116 of resilient or soundproofing material so as to prevent the buckle construction corresponding to the buckle construction 28 from rattling against the connecting panel 114.

With attention now invited more specifically to FIG. 11 of the drawings there will be seen an anchor referred to in general by the reference numeral 118 and which is very similar to the anchor 102 but which includes a single upturned side wall portion 120 in lieu of the pair of downturned side wall portions 104 and 106 of the anchor 102.

In FIG. 9 of the drawings there may be seen a modified form of end plate which may be utilized as a component of any of the aforementioned anchors and which includes a pivoted lever 122 defining the lower limit of the lowermost slot 124 and has a latch structure referred to in general by the reference numeral 126 pivotally secured to its free end as at 128. The free end of the latch structure 126 remote from the pivoted lever 122 is engageable with the abutment 130 carried by an upper portion of the plate for securing the pivoted lever 122 in the operative position thereof illustrated in FIG. 9 of the drawings and closing the outer end of the slot 124.

With attention now invited to FIG. 10 of the drawings there may be seen still another plate referred to in general by the reference numeral 132 and which is similar to the plate illustrated in FIG. 9 except that a single pivoted arm 134 is utilized to close the outer end of the slot 136 corresponding to the slot 124. A removable pin 138 is provided for securing the pivoted arm 134 in the closed position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. In combination, a vehicle seat including a seat back and a seat cushion as well as a conventional seat belt adapted to pass over the lower waist portion of a person seated on said cushion, a child's seat supported from said vehicle seat and including a seat portion spaced above said seat cushion just forward of said seat back, an elongated anchor for said child's seat extending transversely beneath said seat portion, longitudinally spaced portions of said conventional seat belt being engaged with the opposite ends of said anchor and with the portion of said seat belt disposed between said spaced portions extending along said anchor between the opposite ends thereof, and a supplemental seat belt having longitudinally spaced sections thereof engaged with the opposite ends of said anchor and the portion of said supplemental belt disposed between said spaced sections extending over said seat portion, said anchor including bracket members comprising integral sections of a single sheet metal section including a further integral portion defining brace means extending between said bracket members.

2. In combination, an elongated anchor adapted to extend transversely beneath the seat portion of a child's seat supported from a vehicle seat with the seat portion elevated above the cushion portion of the vehicle seat, the opposite end portion of said anchor including end members for releasable attachment of longitudinally spaced portions of a conventional seat belt for said vehicle seat thereto, and a supplemental seat belt including longitudinally spaced sections thereof anchored to the opposite ends of said anchor and adapted, centrally intermediate said sections to pass over the lap of a child seated in the child's seat, said anchor including a pair of opposite end plate sections comprising integral portions of a metallic plate member including a further integral portion extending between the first mentioned integral portions.

3. The combination of claim 2 wherein said metallic plate member also includes integral side walls extending between said end plate sections along opposite sides of said integral portion.

4. The combination of claim 3 wherein said side walls and said end plate sections are directed to the same side of said integral portion.

5. The combination of claim 2 wherein said metallic plate member also includes integral side walls extending between said end plate sections along opposite sides of said integral portion, said side walls and end plate sections being directed toward opposite sides of said integral portion.

6. The combination of claim 2 wherein said end plate sections include slots formed therein having corresponding end portions opening through corresponding edge portions of said end plate sections.

7. The combination of claim 6 wherein said end plate sections include pivoted elongated members swingable between active positions extending across and closing the open ends of said slots and inactive positions allowing free ingress into and free egress from said slots, means operative to releasably secure said elongated members in said active positions.

8. The combination of claim 7 wherein the last mentioned means includes removable locking pins.

9. The combination of claim 7 wherein the last mentioned means includes releasable pivoted latch means.

References Cited

UNITED STATES PATENTS

| | | | |
|---|---|---|---|
| 2,104,830 | 1/1938 | Collard | 297—385X |
| 2,489,087 | 11/1949 | Hewit | 297—250X |
| 2,725,922 | 12/1955 | Smith | 297—255 |
| 2,804,313 | 8/1957 | Gilles | 297—389 |
| 3,227,490 | 1/1966 | Svensson | 297—389 |
| 3,325,213 | 6/1967 | Levy | 297—389 |
| 3,387,883 | 6/1968 | Berlin | 297—253 |
| 3,418,007 | 12/1968 | Jantzen | 297—389X |
| 2,777,502 | 1/1957 | Travis | 297—250 |

FRANCIS K. ZUGEL, Primary Examiner

U.S. Cl. X.R.

297—385